(12) United States Patent
Kim et al.

(10) Patent No.: US 8,701,489 B2
(45) Date of Patent: Apr. 22, 2014

(54) INERTIAL SENSOR

(75) Inventors: Jong Woon Kim, Seoul (KR); Jung Won Lee, Seoul (KR); Seung Hun Han, Gyunggi-do (KR); Won Kyu Jeung, Seoul (KR); Yun Sung Kang, Gyunggi-do (KR); Heung Woo Park, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 163 days.

(21) Appl. No.: 13/213,948

(22) Filed: Aug. 19, 2011

(65) Prior Publication Data

US 2012/0297874 A1    Nov. 29, 2012

(30) Foreign Application Priority Data

May 26, 2011   (KR) .................. 10-2011-0050201

(51) Int. Cl.
  *G01P 15/08*   (2006.01)
  *G01P 1/02*    (2006.01)

(52) U.S. Cl.
  USPC .......................... 73/514.01; 73/493

(58) Field of Classification Search
  USPC ............... 73/514.33, 514.34, 514.35, 514.16, 73/504.12, 504.04, 493, 514.01
  See application file for complete search history.

(56) References Cited

U.S. PATENT DOCUMENTS

| | | | |
|---|---|---|---|
| 6,293,149 B1 * | 9/2001 | Yoshida et al. | 73/514.01 |
| 7,010,976 B2 * | 3/2006 | Ozawa et al. | 73/504.12 |
| 7,334,476 B2 * | 2/2008 | Ichikawa | 73/514.33 |
| 7,540,193 B2 * | 6/2009 | Sato et al. | 73/514.33 |
| 7,650,787 B2 * | 1/2010 | Ino | 73/514.33 |
| 2007/0144259 A1 * | 6/2007 | Ino | 73/514.33 |

* cited by examiner

*Primary Examiner* — Helen Kwok
(74) *Attorney, Agent, or Firm* — Bracewell & Giuliani LLP; Brad Y. Chin

(57) ABSTRACT

Disclosed herein is an inertial sensor. An inertial sensor 100 according to a preferred embodiment of the present invention includes a plate-shaped membrane 110, a mass body 130 that is provided under a central portion 111 of the membrane 110 and includes an integrated circuit, and a post 140 that are provided under an edge 112 of the membrane 110 to surround the mass body 130, whereby the overall thickness and area of the inertial sensor can be reduced by including the integrated circuit in the mass body 130 to implement a thin and small inertial sensor 100.

10 Claims, 4 Drawing Sheets

INERTIAL SENSOR

CROSS REFERENCE TO RELATED APPLICATION

This application claims the benefit of Korean Patent Application No. 10-2011-0050201, filed on May 26, 2011, entitled "Inertial Sensor", which is hereby incorporated by reference in its entirety into this application.

BACKGROUND OF THE INVENTION

1. Technical Field

The present invention relates to an inertial sensor.

2. Description of the Related Art

Recently, an inertial sensor has been used in various fields, for example, the military, such as an artificial satellite, a missile, an unmanned aircraft, or the like, vehicles, such as an air bag, electronic stability control (ESC), a black box for a vehicle, or the like, hand shaking prevention of a camcorder, motion sensing of a mobile phone or a game machine, navigation, or the like.

The inertial sensor generally adopts a configuration in which a mass body is bonded to a flexible substrate such as a membrane, or the like, so as to measure acceleration and angular velocity. Through the configuration, the inertial sensor may calculate the acceleration by measuring inertial force applied to the mass body and may calculate the angular velocity by measuring Coriolis force applied to the mass body.

A process of measuring the acceleration and the angular velocity by using the inertial sensor will be described in detail below. First, the acceleration may be obtained by Newton's law of motion "F=ma", where "F" represents inertial force applied to the mass body, "m" represents a mass of the mass body, and "a" is acceleration to be measured. Among others, the acceleration a may be obtained by sensing the inertial force F applied to the mass body and dividing the sensed inertial force F by the mass m of the mass body that is a predetermined value. Further, the angular velocity may be obtained by Coriolis force "F=2 mΩ·v", where "F" represents the Coriolis force applied to the mass body, "m" represents the mass of the mass body, "Ω" represents the angular velocity to be measured, and "v" represents the motion velocity of the mass body. Among others, since the motion velocity v of the mass body and the mass m of the mass body are values that are known in advance, the angular velocity Ω may be obtained by sensing the Coriolis force (F) applied to the mass body.

FIG. 1 is a cross-sectional view of an inertial sensor according to the prior art. Problems of the prior art will be described with reference to FIG. 1.

As shown in FIG. 1, an inertial sensor 10 according to the prior art is configured to include a mass body 2 that is provided under a central portion of a membrane 1 to generate displacement, a post 3 that are provided under an edge of the membrane 1 to support the membrane 1, and a bottom cap 4 that protects a bottom portion of the inertial sensor 10, or the like. Further, in order to control the inertial sensor 10 and calculate the acceleration and the angular velocity, the bottom portion of the bottom cap 4 is provided with an integrated circuit (IC) 5. In addition, the bottom portion of the integrated circuit 5 is further provided with a lead frame 6 so as to connect the integrated circuit 5 to external circuit boards (printed circuit board, or the like). As a result, the bottom portion of the inertial sensor 10 is provided with components having a predetermined thickness such as the integrated circuit 5, the lead frame 6, or the like, which increases the overall thickness of the inertial sensor 10, such that it is not possible to make the inertial sensor 10 thin.

In addition, pads 7 formed on the membrane 1 and the integrated circuit 5 are connected to each other through wire bonding 8, such that an area of the integrated circuit 5 needs to be wider than that of the bottom cap 4 so as to secure a space in which wire bonding 8 may be performed. Further, the integrated circuit 5 and the lead frame 6 are also connected to each other through the wire bonding 8, such that an area of the lead frame 6 needs to be wider than that of the integrated circuit 5 so as to secure the space in which wire bonding 8 may be performed. As a result, the area of the integrated circuit 5 and the lead frame 6 is sequentially increased as compared with the area of the bottom cap 4 which increases the overall area of the inertial sensor 10, such that it is not possible to make the inertial sensor 10 small.

SUMMARY OF THE INVENTION

The present invention has been made in an effort to provide an inertial sensor capable of reducing an overall thickness and area by including an integrated circuit in a mass body.

According to a preferred embodiment of the present invention, there is provided an inertial sensor, including: a plate-shaped membrane; a mass body that is provided under a central portion of the membrane and includes an integrated circuit; and a post that are provided under an edge of the membrane and surround the mass body.

The inertial sensor may further include: wirings that are formed on a top portion of the membrane; and first through holes that penetrate through the membrane to electrically connect one end of the wirings to the integrated circuit.

The inertial sensor may further include: second through holes that penetrate through the post to be electrically connected to the other end of the wirings, wherein the other end of the wirings extends to the edge of the membrane.

The inertial sensor may further include: connectors that are provided between the mass body and the membrane, wherein the first through holes extend to penetrate through the connectors.

A cross sectional area of the connector contacting the membrane may be smaller than that of the top surface of the mass body.

The inertial sensor may further include sensing electrodes or driving electrodes that are formed on the membrane to be electrically connected to the other end of the wirings.

The inertial sensor may further include a bottom cap that is spaced apart from the mass body and is provided at the bottom portion of the post so as to seal the bottom portion of the post.

The inertial sensor may further include: a bottom cap that is spaced apart from the mass body and is provided at the bottom portion of the post so as to seal the bottom portion of the post, wherein the second through holes extend to penetrate through the bottom cap.

DESCRIPTION OF THE PREFERRED EMBODIMENTS

Figure 1:
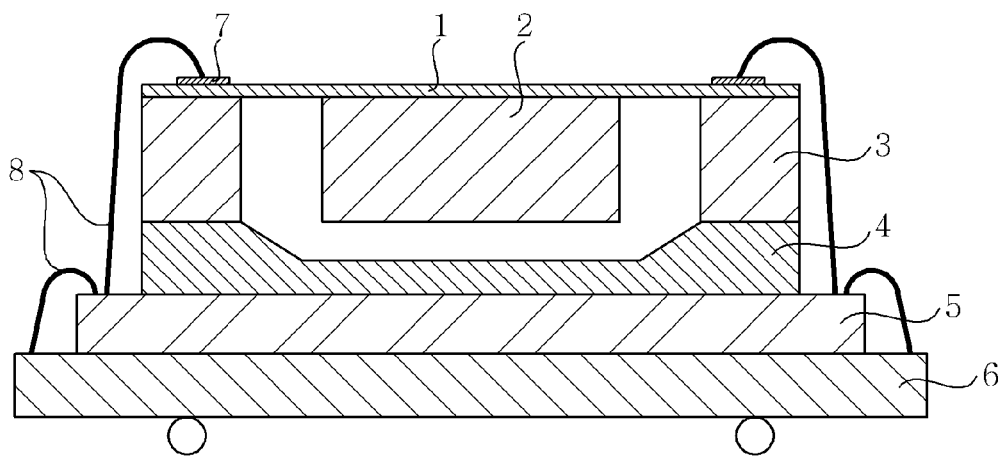
FIG. 1 is a cross-sectional view of an inertial sensor according to the prior art.

Various features and advantages of the present invention will be more obvious from the following description with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Terms used in the specification, 'first', 'second', etc. can be used to describe various components, but the components are not to be construed as being limited to the terms. The terms are only used to differentiate one component from other components. Further, when it is determined that the detailed description of the known art related to the present invention may obscure the gist of the present invention, the detailed description will be omitted.

Hereinafter, preferred embodiments of the present invention will be described in detail with reference to the accompanying drawings.

Figure 2A:
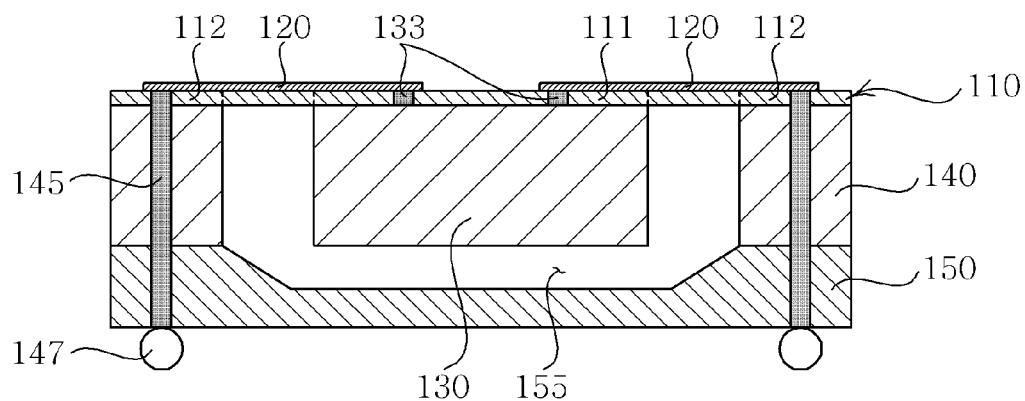
FIGS. 2 and 3 are cross-sectional views according to a preferred embodiment of the present invention.
Figure 2B:
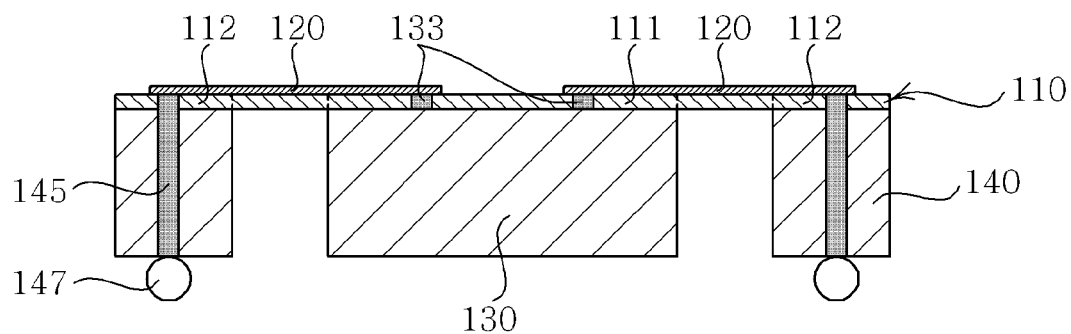
Figure 3:
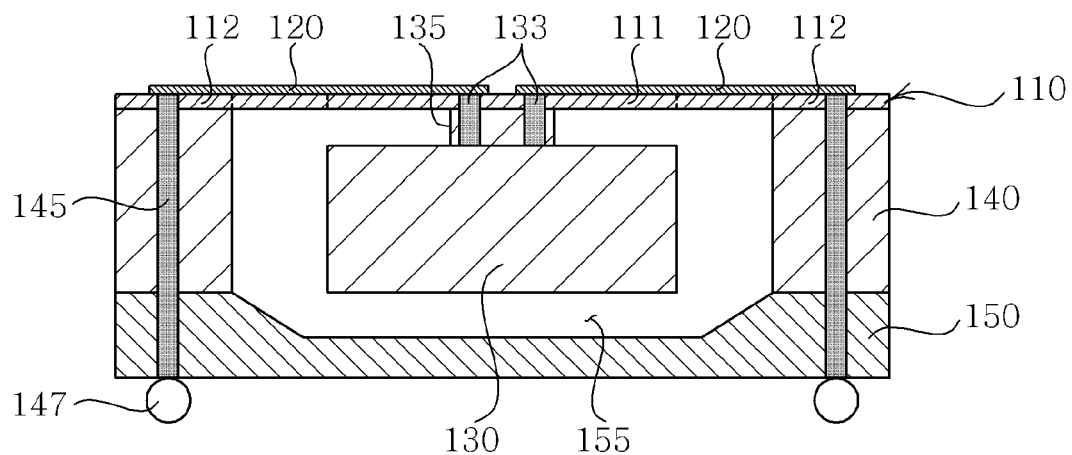
Figure 4:
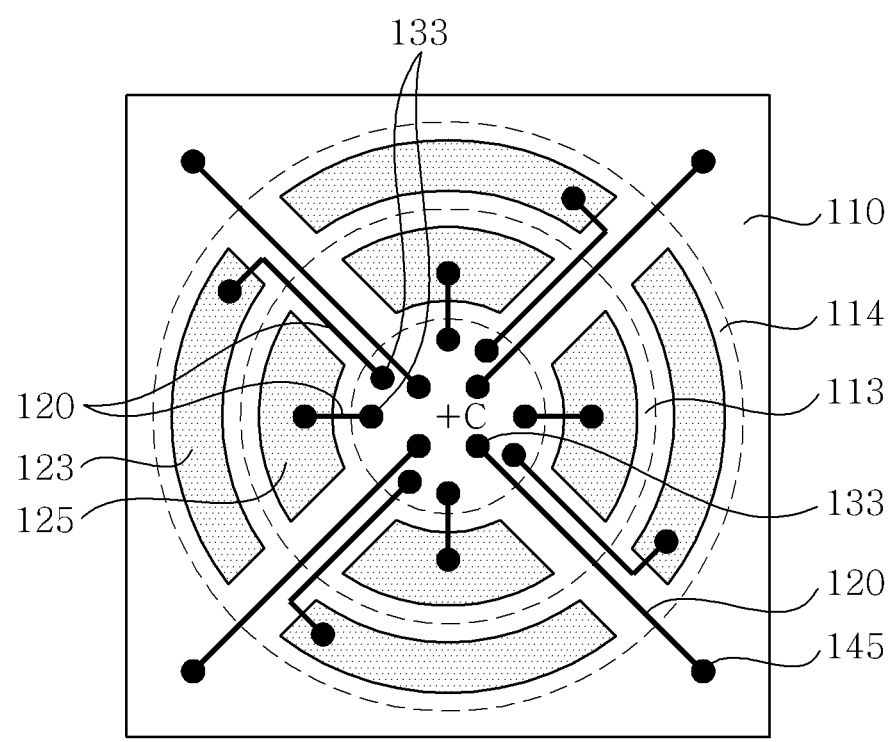
FIG. 4 is a plan view of the inertial sensor shown in FIG. 2.
Figure 5:
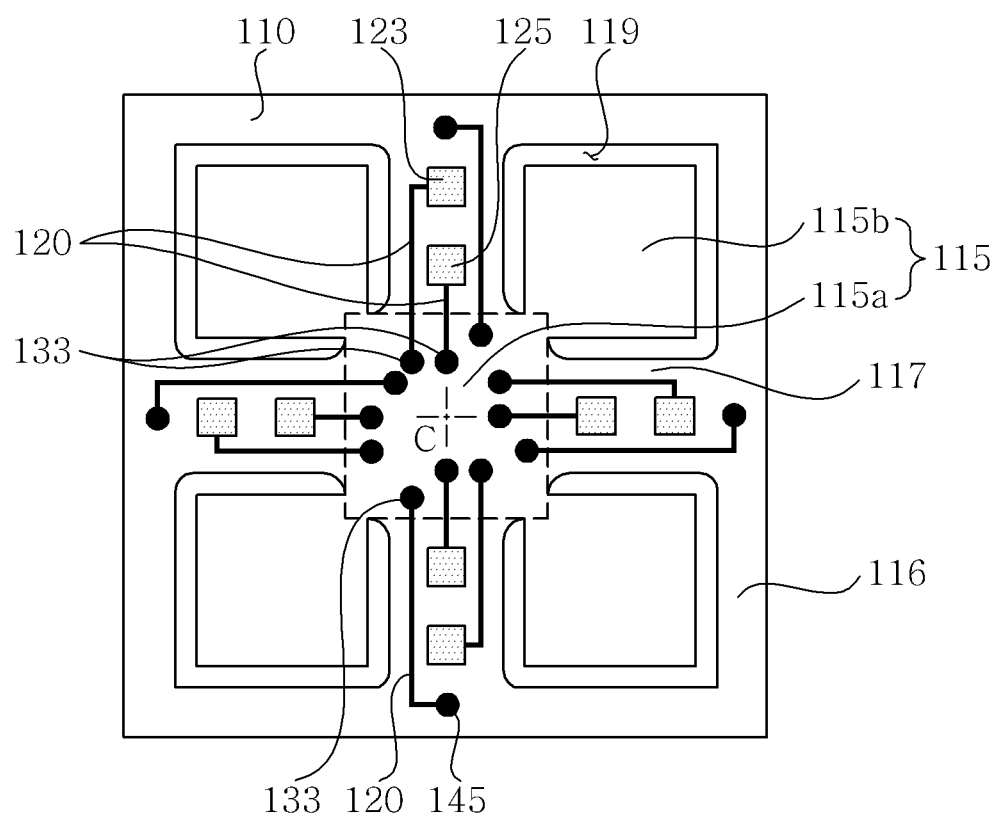
FIG. 5 is a plan view showing a modified example of the membrane shown in FIG. 4.

FIGS. 2 and 3 are cross-sectional views according to a preferred embodiment of the present invention, FIG. 4 is a plan view of the inertial sensor shown in FIG. 2, and FIG. 5 is a plan view showing a modified example of the membrane shown in FIG. 4.

As shown in FIGS. 2 to 5, an inertial sensor 100 according to a preferred embodiment of the present invention is configured to include a plate-shaped membrane 110, a mass body 130 that is provided under a central portion 111 of the membrane 110 and includes an integrated circuit, and a post 140 that are provided under an edge 112 of the membrane 110 to surround the mass body 130.

The membrane 110 is formed in a plate shape and has elasticity so as to vibrate the mass body 130. In this configuration, a boundary of the membrane 110 is not accurately partitioned but may be partitioned into a central portion 111 provided at the center of the membrane 110 and an edge 112 provided along the outside of the membrane 110. In this case, a bottom portion of the central portion 111 of the membrane 110 is provided with the mass body 130, such that the central portion 111 of the membrane 110 is displaced in response to the movement of the mass body 130. In addition, the bottom portion of the edge 112 of the membrane 110 is provided with the post 140 to serve to support the central portion 111 of the membrane 110. Meanwhile, driving electrodes 123 (FIGS. 4 and 5) are disposed between the central portion 111 and the edge 112 of the membrane 110 that are elastically deformed to vibrate the mass body 130 or sensing electrodes 125 (FIGS. 4 and 5) are disposed therebetween to measure the displacement of the mass body 130. However, the driving electrodes 123 and the sensing electrodes 125 are not necessarily disposed between the central portion 111 and the edge 112 of the membrane 110. Some thereof may be disposed at the central portion 111 or the edge 112 of the membrane 110.

The sensing electrode 125 and the driving electrode 123 will be described in detail with reference to FIG. 4. First, the membrane 110 may be partitioned into an inner annular region 113 surrounding a center C thereof and an outer annular region 114 surrounding the inner annular region 113. In this configuration, the sensing electrode 125 may be formed in the inner annular region 113 in an arc shape and the driving electrode 123 may be formed in the outer annular region 114 in an arc shape (however, the positions of the sensing electrode 125 and the driving electrode 123 may be different to each other) In addition, the sensing electrode 125 may be formed while being divided into N and the driving electrode 123 may be formed while being divided into M. In FIG. 4, the sensing electrode 125 and the driving electrode 123 may each be formed while being divided into four, but are not limited thereto. Therefore, the number of sensing electrodes 125 and driving electrodes 123 may be determined in consideration of manufacturing costs or driving force and sensitivity to be implemented. Meanwhile, the driving electrode 123 or the sensing electrode 125 may vibrate the mass body 130 and measure the displacement of the mass body 130, by all the types known to the art, such as a piezoelectric type, a piezoresistive type, or a capacitive type.

In addition, as shown in FIG. 5, the membrane 110 may be formed with slits 119. In this case, displacement parts 115, fixing parts 116, and elastic parts 117 are partitioned based on the boundary of the slits 119. In detail, four slits 119 are formed so as to have a polygonal shape of which one vertex is opened and the one opened vertex of each slit 119 is disposed so as to face a center C of the membrane 110. In this configuration, four slits 119 in the same shape are each formed on the membrane 110 partitioned into four parts and are disposed to be symmetric with each other based on the center C of the membrane 110. In addition, even though the slit 119 has a polygonal shape, the shape of the slit 119 is not specifically limited. That is, the slit may be formed in a quadrangular shape as shown. The displacement part 115 has the mass body 130 provided at the bottom portion thereof, thereby generating the displacement in response to the movement of the mass body 130. In this case, the displacement part 115 is configured to include a central portion 115a including the center C of the membrane 110 and four outside parts 115b surrounded by each slit 119. In addition, the fixing parts 116 have the post 140 bonded to the bottom portion thereof to serve to support the displacement parts 115 and are provided at the outer sides of the four slits 119. Meanwhile, the elastic part 117 connects the displacement part 115 to be displaced with respect to the fixing part 116 with the fixing part 116 and is elastically deformed according to the movement of the mass body 130. In this case, the elastic part 117 is provided between a pair of slits 119 adjacent to each other and thus, four elastic parts 117 connect the central part 115a to the fixing part 116 in a cross shape. As described above, when the slits 119 are provided on the membrane 110, the elastic part 117 is elastically deformed, such that the driving electrode 123 or the sensing electrode 125 may be disposed on the elastic part 117.

Meanwhile, as shown in FIGS. 2 and 3, wirings 120 are formed on the top portion of the membrane 110. The wirings 120 are formed on the top portion of the exposed membrane 110, such that the wirings 120 may be more easily formed through an etching process than being formed on the bottom portion of the membrane 110 sealed by the post 140, the bottom cap 150, or the like. In this case, one end of the wiring 120 is electrically connected to a first through hole 133 and the other end of the wiring 120 is electrically connected to a second through hole 145 or electrically connected to the driving electrode 123 or the sensing electrode 125 (see FIGS.

4 and 5). That is, the wiring 120 serves to electrically connect the first through hole 133 to the second through hole 145 or to electrically connect the first through hole 133 to the driving electrode 123 or the sensing electrode 125 and the detailed description thereof will be described below.

The mass body 130 is displaced by inertial force or Coriolis force and serves to control the inertial sensor 100, including the integrated circuit and is provided under the central portion 111 of the membrane 110. In this configuration, the integrated circuit is electrically connected to one end of the wiring 120 formed on the top portion of the membrane 110 through the first through hole 133 penetrating through the membrane 110. In addition, the other end of the wiring 120 is electrically connected to the driving electrode 123 or the sensing electrode 125 or extends to the edge 112 of the membrane 110 to be electrically connected to the second through hole 145. That is, as shown in FIGS. 4 and 5, the integrated circuit is electrically connected to the driving electrode 123 or the sensing electrode 125 in an order of the first through hole 133 the wiring 120, thereby vibrating the mass body 130 or controlling the displacement of the mass body 130. In addition, the integrated circuit may be electrically connected to the external circuit boards (printed circuit board, or the like) provided under the post 140 in an order of the first through hole 133→the wiring 120→the second through hole 145, thereby inputting/outputting the angular velocity or acceleration related information between the integrated circuit and the external circuit boards. As described above, the integrated circuit is included in the mass body 130, such that there is no need to separately provide the integrated circuit at the bottom portion of the inertial sensor 100. In addition, the wiring 120 formed on the top portion of the membrane 110 instead performs the role of the lead frame of the inertial sensor according to the prior art, such that there is no need to separately provide the lead frame at the bottom portion of the inertial sensor 100. As a result, the inertial sensor 100 according to the preferred embodiment of the present invention reduces the overall thickness by including the integrated circuit in the mass body 130 and removing the lead frame, thereby making the inertial sensor 100 thin.

Meanwhile, the first through holes 133 and the second through holes 145 may be formed by processing the holes using deep reactive-ion etching (DRIE) or laser and then, plating copper or depositing tungsten.

In addition, the type of integrated circuit is not particularly limited, but may be a semiconductor such as an application specific integrated circuit (ASIC), or the like. In this case, the integrated circuit itself may be used as the mass body 130 or may be used as the mass body 130 by packaging the integrated circuit with a molding material such as plastic, ceramic, or the like, so as to protect the integrated circuit. Meanwhile, the mass body 130 including the integrated circuit may be formed in, for example, a cylindrical shape or a squared column shape. However, when the slits 119 are formed on the membrane 110 (see FIG. 5), the mass body 130 may be formed in a fan shape so as to correspond to the displacement part 115 of the membrane 110.

In addition, as shown in FIG. 3, connectors 135 may be provided between the mass body 130 and the membrane 110. In this configuration, the connector 135 serves to connect the mass body 130 to the membrane 110 and to reduce a spring constant of the membrane 110. In detail, the connector 135 is formed so that the cross sectional area of the connector 135 contacting the membrane 110 is to be smaller than that of the top surface of the mass body 130. Therefore, as compared with the case in which the mass body 130 directly contacts the membrane 110, an elastically deformable area in the membrane 110 may actually be wider in the case in which the mass body 130 is connected to the membrane 110 using the connector 135. As described above, the elastically deformable area in the membrane 110 is actually wider, thereby reducing the spring constant of the membrane 110. As a result, the sensitivity of the inertial sensor 100 may be improved by increasing the displacement of the mass body 130 against the same force. Meanwhile, when the connector 135 is provided between the mass body 130 and the membrane 110, the first through hole 133 may extend to penetrate through the connector 135 so as to electrically connect the integrated circuit to the wiring 120.

The post 140 is formed in a hollow shape to support the membrane 110, such that the post 140 serves to secure a space in which the mass body 130 may be displaced. In this case, the post 140 is provided under the edge 112 of the membrane 110. In addition, as described above, the post 140 may be provided with the second through hole 145. In this case, the second through hole 145 penetrates through the post 140, such that one end thereof may be electrically connected to the wiring 120 and the other end thereof may be electrically connected to the external circuit boards provided under the post 140 through a solder ball 147, or the like. That is, the inertial sensor 100 according to the preferred embodiment of the present invention includes the second through hole 145 penetrating through the post 140, such that the electrical connection may be made in an order of the integrated circuit→the first through hole 133→the wiring 120→the second through hole 145→the external circuit board. Therefore, the wire bonding such as the prior art may be omitted and thus, there is no need to secure the space in which the wire bonding may be performed. As a result, the overall area of the inertial sensor 100 is reduced, such that the inertial sensor 100 can be miniaturized.

Meanwhile, the post 140 may be formed in a squared column shape in which the squared cavity is formed at the center of the post 140. That is, when viewing based on the cross section, the post 140 is formed in a squared shape in which the squared cavity is formed at the center thereof. However, the shape of the post 140 is an example and therefore, is not necessarily limited thereto. As a result, the post 140 may be formed in all the shapes known to the art.

In addition, the bottom portion of the post 140 may be provided with the bottom cap 150 sealing the bottom portion of the post 140 (see FIGS. 2A to 3). In this configuration, the bottom cap 150 serves to protect the bottom portion of the inertial sensor 100 and a portion of the bottom cap 150 corresponding to the mass body 130 may be provided with a concave part 155 so as not to hinder the vibration of the mass body 130. As described above, when the bottom cap 150 is provided, the bottom portion of the bottom cap 150 is provided with the external circuit board. Therefore, the second through hole 145 may extend to penetrate through the bottom cap 150 so as to electrically connect the wiring 120 to the external circuit board. However, the bottom cap 150 is not an essential component and as shown in FIG. 2B, the bottom cap 150 may be omitted.

As set forth above, the preferred embodiment of the present invention can reduce the overall thickness and area of the inertial sensor by including the integrated circuit in the mass body, thereby implementing a thin and small inertial sensor.

Further, the preferred embodiment of the present invention can electrically connect the integrated circuit to external circuit boards through the first through holes penetrating through the membrane and the second through holes penetrating through the wirings and the post that are formed on the membrane, thereby removing the separate lead frame.

Although the embodiment of the present invention has been disclosed for illustrative purposes, it will be appreciated that an inertial sensor according to the invention is not limited thereby, and those skilled in the art will appreciate that various modifications, additions and substitutions are possible, without departing from the scope and spirit of the invention. Accordingly, any and all modifications, variations or equivalent arrangements should be considered to be within the scope of the invention, and the detailed scope of the invention will be disclosed by the accompanying claims.

What is claimed is:

1. An inertial sensor, comprising:
    a plate-shaped membrane;
    a mass body that is provided in the membrane and includes an integrated circuit;
    a post that is provided in the membrane and supports the membrane to enable the mass body to float;
    wirings that are formed on a top portion of the membrane; and
    first through holes that penetrate through the membrane to electrically connect one end of the wirings to the integrated circuit.

2. The inertial sensor as set forth in claim 1, further comprising:
    second through holes that penetrate through the post to be electrically connected to the other end of the wirings,
    wherein the other end of the wirings extends to the edge of the membrane.

3. The inertial sensor as set forth in claim 1, further comprising connectors that are provided between the mass body and the membrane, wherein the first through holes extend to penetrate through the connectors.

4. The inertial sensor as set forth in claim 3, wherein a cross sectional area of the connectors contacting the membrane is smaller than that of a top surface of the mass body.

5. The inertial sensor as set forth in claim 1, further comprising sensing electrodes and driving electrodes that are formed on the membrane to be electrically connected to the other end of the wirings.

6. The inertial sensor as set forth in claim 1, further comprising a bottom cap that is spaced apart from the mass body and is provided at a bottom portion of the post so as to seal the bottom portion of the post.

7. The inertial sensor as set forth in claim 2, further comprising a bottom cap that is spaced apart from the mass body and is provided at a bottom portion of the post so as to seal the bottom portion of the post,
    wherein the second through holes extend to penetrate through the bottom cap.

8. The inertial sensor as set forth in claim 2, wherein the first through holes and the second through holes are formed by processing the holes, plating copper or depositing tungsten.

9. The inertial sensor as set forth in claim 1, wherein the membrane is formed with slits.

10. The inertial sensor as set forth in claim 9, wherein the slits are formed so as to have a polygonal shape of which one vertex is opened and the one opened vertex of each slit is disposed so as to face a center of the membrane.

* * * * *